LEWIS MURR.
Improvement in the mode of Printing and Embossing Cloth.
No. 4,752. Reissued Feb. 13, 1872.
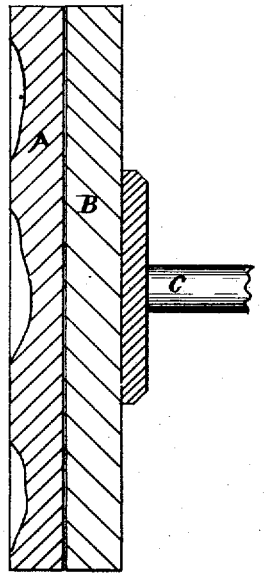
Witnesses:
Franklin Barritt.
Richard Gerner
Inventor:
Lewis Murr's
assignors
Joseph and Bernard Metz
per Henry Gerner
Attorney

UNITED STATES PATENT OFFICE.

LEWIS MURR, OF PHILADELPHIA, PENNSYLVANIA, ASSIGNOR TO JOSEPH METZ AND BERNHARD METZ.

IMPROVEMENT IN THE MODE OF PRINTING AND EMBOSSING CLOTH.

Specification forming part of Letters Patent No. 75,957, dated March 24, 1868; reissue No. 4,752, dated February 13, 1872.

Specification describing certain Improvements in Mode of Printing and Embossing Cloth, invented by LEWIS MURR, of the city of Philadelphia, State of Pennsylvania, assignor to JOSEPH METZ and BERNHARD METZ, of same place.

This invention consists in a novel mode of printing and embossing ornamentations on fabrics by the use of an engraved plate applied directly to the cloth, and a heated metallic plate interposed between the engraved plate and the press, as hereinafter described.

Hitherto the art of printing and embossing figures and designs on fabrics has demanded consecutive or separate operations. The ordinary stencil is often employed, and the figures or patterns filled in afterward. The colors have been piled up or laid on thickly, so as to project the figures and present the appearance of raised words. This mode is defective, since the colors are brittle and liable to crack, and every time the figure comes in contact with any object a portion thereof is broken off, and soon the ornamentation is destroyed and the fabric laid bare again.

In carrying out this invention, an ordinary brass plate, A, is engraved, with sunk or depressed figures, such as flowers, fruit, animals, or whatever design or representation is desired, and is then charged or fed throughout with various colors, according to taste. This plate is applied directly to the top of the cloth or fabric, the colors being in a wet state. An iron plate, B, is then heated to a certain degree and laid on the top or back of the engraved plate, and the whole is placed under a press, C, of certain power. This iron plate is extremely necessary in my process. If the engraved plates were heated, they would not only burn or scorch the fabric, but the fine lines become rough, as well as the whole surface of the engraving; the color will immediately dry, and be useless for the purpose intended. Therefore it is extremely necessary to apply first a cold plate, with wet colors, to the cloth.

The hot iron plate being applied to the engraved plate, the heat will slowly be diffused through the latter plate while the cloth and the two plates are under pressure. The color is gradually absorbed by the fabric as it enters or is forced into the depressions or engraved portions of the plate, and then it dries with a uniform and elastic finish; and so perfect is the drying that each ornamentation appears to be homogeneous from the surface to the back of the fabric, and, therefore, the parts thus ornamented present the appearance of fine velvet, or ordinary worsted, embroidered, or raised work.

The engravings for each pattern or design are made on one plate; but the various colors are applied thereto, respectively, on the same plate.

We are aware that fabric has been ornamented in colors, but not simultaneously printed and embossed at one operation by the process herein specified.

The invention can be applied to any fabric, and in the ornamentation, especially, of ladies' cloaks and skirts.

We desire to claim as new and secure by Letters Patent—

The printing and embossing of cloth or other fabric at one operation by the employment of an engraved plate applied directly to such fabric, and a heated plate applied to the engraved plate, substantially as and for the purpose set forth.

JOSEPH METZ,
BERNHARD METZ,
*Assignees of* LEWIS MURR, *prior to July* 8, 1870.

Witnesses:
P. J. ROSENBERG,
F. H. GOBLE.